(12) United States Patent
Alexandre et al.

(10) Patent No.: US 7,844,962 B2
(45) Date of Patent: Nov. 30, 2010

(54) PATCHING DEVICE FOR A PROCESSOR

(75) Inventors: Rudolph Alexandre, Saint-Josse-ten-Noode (BE); Vincent Charlier, Auderghem (BE); Tiana Rahaga, Evere (BE); Yves Vandersmissen, Brussels (BE)

(73) Assignee: STMicroelectronics Belgium NV, Zaventem (BE)

( * ) Notice: Subject to any disclaimer, the term of this patent is extended or adjusted under 35 U.S.C. 154(b) by 989 days.

(21) Appl. No.: 11/267,927

(22) Filed: Nov. 4, 2005

(65) Prior Publication Data
US 2006/0107104 A1    May 18, 2006

(30) Foreign Application Priority Data
Nov. 4, 2004    (GB)    ................... 0424424.0

(51) Int. Cl.
*G06F 9/44*    (2006.01)
(52) U.S. Cl. .................. 717/168; 711/102; 711/215; 712/226
(58) Field of Classification Search .......... 717/168; 711/132
See application file for complete search history.

(56) References Cited

U.S. PATENT DOCUMENTS

| | | | |
|---|---|---|---|
| 4,542,453 A * | 9/1985 | Patrick et al. ................ | 714/8 |
| 6,260,157 B1 * | 7/2001 | Schurecht et al. ............ | 714/8 |
| 6,438,664 B1 * | 8/2002 | McGrath et al. ............ | 711/154 |
| 2004/0163080 A1 * | 8/2004 | Menon et al. ............... | 717/168 |
| 2004/0210720 A1 * | 10/2004 | Wong et al. ................. | 711/132 |

OTHER PUBLICATIONS

IEEE Standard Glossary of Software Engineering Terminology, Dec. 10 1990, IEEE Computer Society.*
A Krishnaswamy, R Gupta, Profile guided selection of ARM and thumb instructions, ACM SIGPLAN Notices, vol. 37, Issue 7 (Jul. 2002), pp. 56-64.*

* cited by examiner

*Primary Examiner*—Hyung S Sough
*Assistant Examiner*—Kimberly Jordan
(74) *Attorney, Agent, or Firm*—Lisa K. Jorgenson; James H. Morris; Wolf, Greenfield & Sacks, P.C.

(57) ABSTRACT

A code patching device is provided for use with a processor having a read-only memory which stores instruction code and a further memory for storing patch code. A plurality of patch address registers each store an address, in the read-only memory, at which a patch is to be performed. A comparator compares the address of the read-only memory that is being accessed by the processor with the addresses stored in the registers. A control unit selects between code from the read-only memory or patch code from the further memory depending on the comparison. The code patching device can replace, on-the-fly, erroneous lines of code from the read-only memory by corrected ones. During an initialization process the patch code is loaded into the further memory and the registers are loaded with the addresses which require patching.

14 Claims, 3 Drawing Sheets

| Name | Bit mapping | | | | | | | | | | | | | | | | Access |
|---|---|---|---|---|---|---|---|---|---|---|---|---|---|---|---|---|---|
| | b15 | b14 | b13 | b12 | b11 | b10 | B9 | b8 | b7 | b6 | b5 | b4 | b3 | b2 | b1 | b0 | |
| STATUS | u | u | u | u | u | u | u | u | u | u | u | u | u | u | u | Status | R/W |
| IS_BASE | u | u | RAM_BASE[15:2] | | | | | | | | | | | | | | R/W |
| PA_LSB(i) | PA_LSB | | | | | | | | | | | | | | | | R/W |
| PA_MSB(i) | u | u | u | u | u | u | u | u | u | u | u | u | u | PA_MSB | | | R/W |
| TAIL(j) | Tail (j x 16 – 1) ... Tail (j x 16) | | | | | | | | | | | | | | | | R/W |
| BL(j) | BL (j x 16 – 1) ... BL (j x 16) | | | | | | | | | | | | | | | | R/W |

*u* means unused and *R/W* read/write

*i* may go from 0 to (N - 1)

*j* may go from 0 to (2 x N / 16)

Fig. 6

PATCHING DEVICE FOR A PROCESSOR

FIELD OF THE INVENTION

This invention relates to processors, e.g. digital processors, which have read-only memory associated with them as well as methods of operating them. The present invention particularly relates to a patching device for a processor as well as methods of operating and constructing such a patching device.

BACKGROUND OF THE INVENTION

Microprocessors are used in a wide range of applications. A microprocessor-based system generally comprises a processor and a non-volatile memory device which stores a set of instructions that are to be performed by the processor to provide a desired application. The non-volatile memory on which the instructions are stored can be a read only memory (ROM) which forms part of the same integrated circuit, or the same package, as the processor. Such an arrangement is often known as 'System-on-Chip'. This arrangement has the advantages of being physically compact, and cost-effective for high-volume applications as the ROM can be created in the same manufacturing process as the processor. However, the use of a read-only memory has a disadvantage that the set of instructions are frozen and cannot be subsequently changed. It is sometimes necessary to update a set of instructions to correct defects—'bugs'—which are discovered in the instructions after manufacture.

SUMMARY OF THE INVENTION

An object of the present invention is to provide improved processors, e.g. digital processors, which have read-only memory associated with them as well as methods of operating them. In particular, the present invention seeks to improve the operation of a processor.

A first aspect of the present invention provides a patching device, e.g. for patching instruction code and/or data for use with a processor having a non-volatile memory such as a read-only memory which stores data such as instruction codes and a second memory for storing patch data, e.g. patch code, the patching device comprising:

a plurality of memory locations in a third memory, e.g. patch address registers, each location operable to store an address, in the first memory, at which a patch is to be performed;

a comparator which is operable to compare the address of the first memory that is being accessed by the processor with the addresses stored in the locations in the third memory, e.g. in the registers;

a control unit which is operable to select between data, e.g. code from the first, e.g. read-only memory or patch data, e.g. code from the second memory depending on the comparison. The patching device can be used with more than one processor, e.g. two or more processors. A processor generally has an Arithmetic Logic Unit (ALU) and at least one register, e.g. for a program instruction counter.

An advantage of the present invention is that the patching mechanism is not processor-dependent. The patch mechanism resides completely outside the processor—it does not require any modifications of the fetch/decode unit of the processor. This is achieved by using a comparator which operates on signals which issue from the processor or processors and are therefore accessible external to the processor(s). The comparator is operable to compare the address of the first memory, e.g. read-only memory that is currently present on an address bus with the addresses stored in the locations of the third memory, e.g. in the registers. The address bus is accessible from external to the processor. The processor can be considered as a "black-box".

Further, the present invention does not require a dedicated memory to store the code patches. The second memory can be a central data memory such as Random Access Memory (RAM) of the system which is provided for other reasons anyway. Further, the size of the patch area can be made fully dynamic which optimizes the RAM usage.

Another advantage is that the patch mechanism is fully real-time. For example, it does not need any pipeline or sequential stage.

A further advantage is that the patch mechanism, in accordance with the present invention, allows to patch one instruction by a set of instructions without the overhead of an unconditional branch operation. Accordingly, the real MIPS rate is not impacted. The control of a multi-instruction patch can be provided by a suitable identification mechanism, e.g. a tail bit mechanism. A further advantage is that the lengths of the instructions to be patched need not be the same, e.g. a 16-bit instruction can be patched by a 32-bit instruction. An example is provided by a processor which supports more than one instruction length: the ARM processor supports two instruction sets: 16-bit THUMB instructions set and 32-bit ARM instructions set.

Another advantage of the present invention is that the number of patches supported by the mechanism is fully configurable at the circuit level (e.g. via VHDL) through one single parameter to fully optimize the area used versus the patchability. The overall result is a small area overhead for supplying the patching function. For example, by using a real-time comparator of the address bus of the processor, only the to-be-patched addresses need to be marked—there is no need to attach an extra bit to all address lines of the first memory, e.g. ROM. A further advantage is that the present invention allows patching a constant data in the first memory, e.g. ROM. The patch mechanism of the present invention can patch everything coming from the first memory, e.g. ROM: instructions or constant data, for example.

The patching device described above can be used to replace, on-the-fly, erroneous lines of code from the first memory, e.g. read-only memory by corrected ones. Thus, errors in the original code can be corrected in an efficient manner. This can be achieved without inserting extra wait states on the bus which is used by the processor. Preferably, the second memory is a random access memory (RAM) which forms part of the normal processor package. Use of RAM can minimize access times to the patch code. System RAM is designed to operate at the processor speed so its use is advantageous. Alternatively, the second memory can be an external memory. During an initialization process the patch code is loaded into the second memory and the locations of the third memory, e.g. the registers are loaded with the addresses which require patching.

Preferably, the comparator is operable to perform the comparison of the address of the first memory, e.g. the read-only memory that is being accessed by the processor with each of the addresses stored in the plurality of locations of the third memory, e.g. the registers, in parallel. This allows a quick comparison to be made.

The patching device stores an address, in the second memory (e.g. RAM), at which the patch code is stored. One particularly advantageous way of achieving this is to store a base address of an area of the second memory where the patch code is stored in a suitable memory location, e.g. in a register.

At initialization, a table is created which includes indexes which point to the location of each patch within that area of second memory.

Preferably the patching device further comprises at least one memory location, e.g. register for storing an indication of whether a patch instruction code is part of a block of patch code. If the patch code comprises a block of two or more instructions then this block can be stored contiguously in a memory. The index which points to the location of the patch code in the second memory is set according to the size of each block. This allows more efficient use to be made of the second memory where the patch code is stored. In contrast, if the addresses of patches were hard-wired, this would require the memory to be segmented into unnecessarily large blocks (many of which would not be fully used). Also, if each patch were restricted to a single instruction, this would require patches of two or more instructions to be divided between the area reserved in the second memory and an additional memory space, which would be inefficient for such small segments of code.

The patching device can perform the comparison of addresses on an instruction-by-instruction basis. If the patch instruction code is part of a block of patch code, the control unit is operable to cause one of the patch address memory locations, e.g. registers, to store the address of the subsequent patch instruction in the second memory. When the comparator next performs a comparison of the current address with the patch addresses stored in the registers the comparator will make a successful match and will continue to allow the control unit to read the next instruction in the block of patch code.

The present invention has the advantage of allowing optimal usage of memory size. Further, several patches can be made in parallel. This can be configurable from an implementation point of view, e.g. the way the register level program, e.g. VHDL, is written. Further, one second memory, e.g. a RAM, that can be the processor RAM for example, can be shared between different patches. One patch only uses the exact number of memory spaces it needs to solve a bug. The rest of the RAM can be used for other bugs. The present invention allows definition of where the bug is and to solve n optimum number of bugs with a limited amount of memory. The present invention provides the addition of an identification mechanism such as a tail bit with each address/instruction patched. This addition allows:

To patch easily one or two instructions only directly in the dedicated address and then return to normal behavior To have several instructions that allow a branch to an other place of the memory where the rest of the patch is situated To better utilize the reserved memory for patchable addresses. For example, only the number of places needed is used.

The present invention can be used with a wide variety of processors having different types of instruction set, e.g. RISC, CISC. Some processors have different kinds of instructions. The patching device according to the present invention can store an indication of whether a patch instruction code is for one kind of instruction or another. For example, Reduced Instruction Set Computers (RISC) such as ARM processors have a form of instruction known as a THUMB mode BL (Branch and Link) instruction. This requires different handling than normal instructions and thus it is preferable that the code patching device stores an indication of whether a patch instruction code is a THUMB mode Branch and Link instruction.

Further aspects of the invention provide a processor arrangement which includes the code patching device and a method of performing the code patching. In particular the present invention may be implemented as a system on chip.

BRIEF DESCRIPTION OF THE DRAWINGS

Embodiments of the invention will be described, by way of example only, with reference to the accompanying drawings in which:

FIG. 6 shows registers used by the controller of FIG. 1 in embodiments of the present invention.

DETAILED DESCRIPTION

The present invention will now be described with reference to certain embodiments and with reference to the above mentioned drawings. Such description is by way of example only and the invention is not limited thereto.

A Patch RAM controller (PRC) in accordance with any of the embodiments of the present invention can be used with a wide range of microprocessor architectures. The code patching device can be used with more than one processor, e.g. two or more processors. The present invention can be used with a wide variety of processors having different types of instruction set, e.g. RISC, CISC. The instruction set is not considered to be a limitation on the present invention. A processor generally has an Arithmetic Logic Unit (ALU) and at least one register, e.g. for a program instruction counter.

The following embodiment describes the application of the invention in a specific example to an ARM™7TDMI architecture but the invention is by no means limited to this processor nor this type of processor. A useful reference for ARM processors is "ARM system-on-chip architecture", S. Fueber, Addison-Wiley 2000. References to the 'ARM' are to the microprocessor. Such a microprocessor is also referred to as a "core".

The PRC according to embodiments of the present invention allows several patching possibilities:

patching a constant: for an instruction like LDR R0,=0x12345678, the ARM will fetch the constant 0x12345678 at some address in ROM and put it in register R0. This constant can be replaced by another one through the PRC.

direct instruction patching: an instruction in ROM can be directly replaced by one or more patch instructions from the patch RAM.

indirect instruction patching: a patch is done by replacing an instruction in ROM by one or more instructions that perform a jump to a location in RAM where the real patch is stored.

Figure 1:
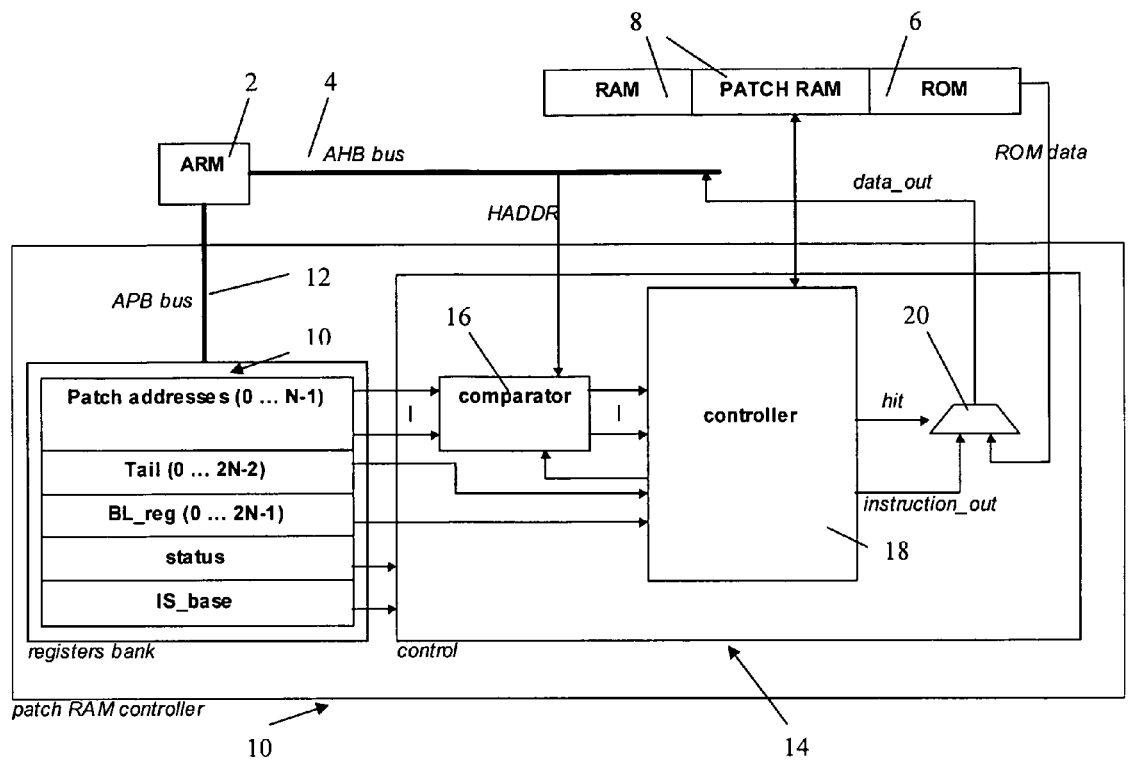
FIG. 1 shows an overview of a Patch RAM controller in accordance with an embodiment of the invention.

FIG. 1 shows a block diagram of a Patch RAM Controller (PRC) in accordance with an embodiment of the present invention.

Patch RAM Controller Inputs

In order to be able to patch, the PRC should preferably be programmed with:

Patch Addresses (PA): the addresses in a first non-volatile memory, preferably a ROM where a patch should be done Patch instructions (PI): every patch address is associated with one or more instructions that need to replace the erroneous one Optionally a mechanism is provided to indicate whether a patch comprises more than one instruction. For example, a tail bit can be provided. Since a patch can comprise more than one instruction, preferably a mechanism is needed to indicate if a PI is part of such a "PI block" or not. In accordance with an aspect of the present invention, every PI can be provided with a flag, tag or marker that indicates if it is part of a PI block. For example, every PI has a tail bit that is set to '1' if the next PI is part of the "PI block".

Some processors use different kinds of instructions. Every PI can be provided with a flag, tag or marker that indicates a kind of instruction. For example, a BL bit can be provided. The THUMB mode BL (Branch and Link) instruction requires a slightly different way of patching (explained later in this document) than the other ones. That's why for every PI, there is a BL bit that is set to '1' if the PI is a THUMB mode BL.

Patch RAM Controller Outputs

After programming the PRC, it will start comparing the patch addresses with the address present on the ARM bus. If a match occurs, PRC will make sure that the relevant patch instruction(s) is (are) put on the ARM bus instead of the instruction from the ROM. The bus is freely accessible from external to the processor. Thus no changes to the processor are required. Also there is no effect on the MIPS as the processor operation is not altered.

FIG. 1 shows the Patch Ram Controller module 1 connected:

- to a processor, e.g. the ARM processor core 2, through the AHB (Advanced High Performance) bus 4,
- to a first non-volatile memory, e.g. read only memory (ROM) 6, and
- to a second memory, e.g. an internal RAM 8. The connection to the internal RAM 8 is necessary, because the patch instructions are stored there. Instead of an internal RAM an external memory can be used. The locations of the patch instructions are to be programmed in a third memory, e.g. a PRC register or a register bank 10.

The number of patches can be defined by a Very High Speed Integrated Circuit Hardware Description Language (VHDL) generic (N). Although this is fixed for a given design it can be easily adapted for re-use of the PRC in other designs. It allows N patch addresses and 2*N patch instructions.

The third memory, namely the PRC registers 10, is programmed via the APB (Advanced Peripheral) bus 12. The PRC control block 14 comprises three main parts:

Comparator 16: compares the address on the ARM bus (HADDR) to the patch addresses. The result goes to the controller 18.

Controller 18: determines if and on which address a match occurred. In case of a match, it fetches the corresponding patch instruction(s) from the internal RAM 8 and drives the multiplexer or switch 20 appropriately to select the ROM data or the Patch RAM data.

Mux 20: a multiplexer or switch that selects between ROM data and patched data (instruction_out) from controller 18 according to the hit signal from the controller 18.

Implementation Details 1.1. Associating Patch Addresses with Patch Instructions

Before the Patch RAM Controller module 1 starts functioning, it preferably goes through an initialization step of 2*N cycles after programming the PRC. During this initialization, an address table (IS_Addr_table) is generated that holds for each patch address, the index of the corresponding patch instruction in RAM 8.

In case of a patch block the index is the index of the first PI. Note that a match at PA(i) does not necessarily mean that PI(i) has to be fetched. Consider following examples with N=2:

TABLE 1

Initialization example 1

| Patch Addresses | Patch Instructions | Tail bit |
|---|---|---|
| PA0 | PI0 | '1' |
| PA1 | PI1 | '0' |
| X | PI2 | '1' |
| X | PI3 | '0' |

TABLE 2

Initialization example 2

| Patch Addresses | Patch Instructions | Tail bit |
|---|---|---|
| PA0 | PI0 | '0' |
| PA1 | PI1 | '0' |
| X | PI2 | '0' |
| X | PI3 | '0' |

In example 2, there are no patch blocks, since no tail bit is set. As a consequence PA0 and PA1 correspond to PI0 and PI1. In example 1 however, PI0 and PI1 are associated to PA0, as are PI2 and PI3 to PA1. In other words, a match at PA1 does not result in a fetch of PI1 but of PI2 (and PI3).

Figure 2:
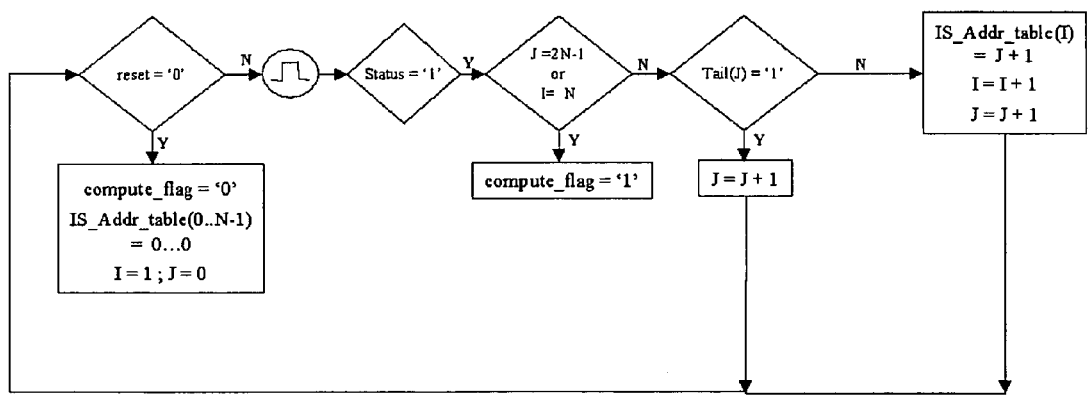
FIG. 2 shows a flow diagram of an initialization process performed by the controller of FIG. 1 in accordance with an embodiment of the present invention.

FIG. 2 shows a flow diagram of an initialization in accordance with an embodiment of the present invention.

The initialization process for examples 1 and 2 (shown in tables 1 and 2 above) will now be described.

Initialization for Example 1:
reset: IS_Addr_table[1:0]=[0, 0]; I=1; J=0; compute_flag='0'
reset released, status bit set, rising edge clock→Tail(0)='1' ? Yes→J :=J+1:=1
rising edge clock→Tail(1)='0' ? No→IS_Addr_table(1):=2; J:=2; I:=2
rising edge clock→Tail(2)='1' ? Yes→J :=J+1:=3
rising edge clock→J=3=2*N-1→compute_flag='1' (=start patching)

Result: IS_Addr_table[1:0]=[2, 0], i.e. fetch PI0 when match at PA0 and fetch PI2 when match at PA1.

Initialization for Example 2:
reset: IS_Addr_table[1:0]=[0, 0]; I=1; J=0; compute_flag='0'
reset released, status bit set, rising edge clock→Tail(0)='0'? No→IS_Addr_table(1):=1;J:=1; I :=2;
rising edge clock→I=2=N→compute_flag='1' (=start patching)

Result: IS_Addr_table[1:0]=[1, 0], i.e. fetch PI0 when match at PA0 and fetch PI1 when match at PA1

Comparator

Figure 3:
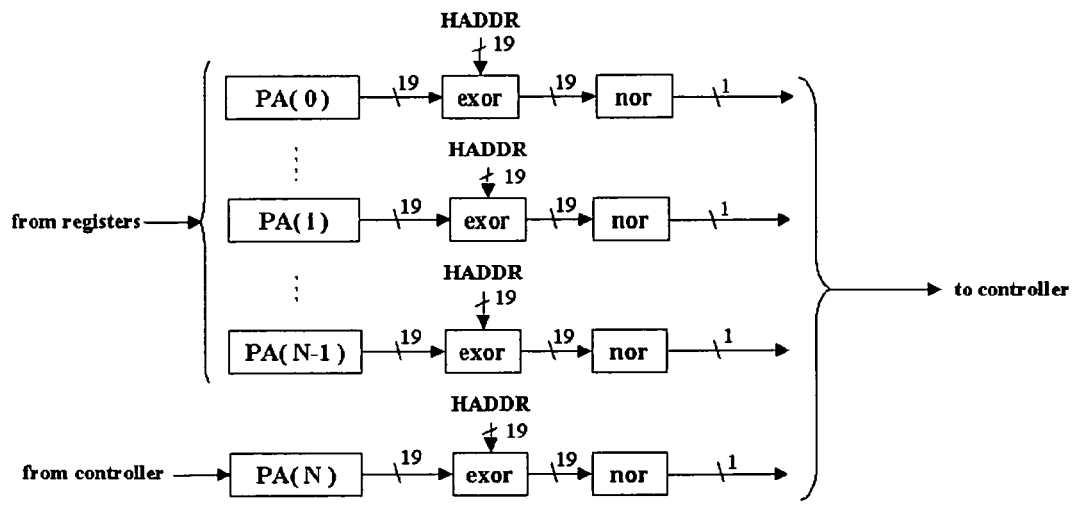
FIG. 3 schematically shows a comparator used in the controller of FIG. 1 in accordance with an embodiment of the present invention.

FIG. 3 shows the implementation of the comparator 16 in accordance with an embodiment of the present invention. The comparator 16 shown in FIG. 3 compares the 19 LSB (Least Significant Bits) of the ARM address (HADDR) with each of the N 19-bit patch addresses (cf. in the registers of the register bank 10) and an extra 19-bit address (the "Nth patch address") coming from the controller 16. These comparisons can be done in parallel to save time. The output is a (N+1)-bit vector for which bit(k) becomes '1' in case of a match between HADDR and PA(k) (k=0 . . . N). The comparator 16 can comprise and a plurality of first inputs from the register bank 10, one second input from the controller 16, EXOR gates connected to the first and second inputs and each having to an input from the AHB 4 providing the current address on that bus—HADDR, and a plurality of NOR gates connected to the outputs of the EXOR gates and each having an output providing one element of the vector. The vector is provided to the controller 18.

No comparison is done if compute_flag='0' or if ROM 6 is not accessed (HSEL_ROM='0') or if the access to ROM 6 is an idle cycle (no data transfer required).

Multiplexer

The multiplexer 20 selects between 32-bit data from ROM 6 or 32-bit data from PRC controller 18 and puts one of the two on the AHB bus 4 to the ARM core 2. The selection signal (hit) also comes from PRC controller 18. When hit is '0', no match between the current address on the AHB 4-HADDR- and a patch address occurred and the data coming from the ROM 6 is put on the AHB bus 4. If hit is '1', the current HADDR matches a patch address and the corresponding patch instruction is put on the bus 4.

PRC Control

Patching with One Patch Instruction

The result from the comparator 16 is used by PRC control module 14 to determine if a match occurs (hit) and at which patch address (index). Based on this index, the address of the patch instruction (IS_Addr) is derived from the address table (IS_Addr_table) and the patch instruction is fetched from internal RAM8. In ARM mode, the full 32-bit instruction will be passed to the multiplexer 20. In thumb mode the 16 LSB of the patch instruction will be duplicated and passed to the multiplexer 20, unless it concerns the high part (BL_H) of the BL instruction (see below). In this last case the 16 MSB (Most Significant Bits) are duplicated and passed to the multiplexer 20. If in thumb mode a 32-bit data access is done on a patch address, the full 32 bit data are put on the bus 4 to the ARM core 2.

Patching More than One Patch Instruction: Tail Bit Mechanism

A patch with more than one instruction works in practically the same way as a patch with one instruction, i.e. a match of HADDR and PA(j) (j=0 . . . N−1), fetching of the first patch instruction and sending it to the multiplexer 20.

Additionally, because the tail bit corresponding to this instruction is set, PRC control module 14 assigns to PA(N) (the "Nth patch address") the address following the patch address on which a match occurred. For example, PA(N)= PA(j)+2 in THUMB mode or PA(N)=PA(j)+4 in ARM mode. At the same time, IS_Addr_table(N) is assigned the index of the next patch instruction in the block (IS_Addr_table(N)= IS_Addr_table(j) +1). As a result, the next access of the ARM core 2 to PA(j)+2/4 will cause a match with PA(N). The instruction at the index stored in IS_Addr_table(N) is fetched. If the corresponding tail bit is again set, PRC control module 14 will make PA(N)=PA(N)+2/4 and IS_Addr_table(N)= IS_Addr_table(N)+1. The access to PA(N)+2/4 will then result in a match and the corresponding instruction is passed to the bus 4, etc.

This mechanism continues until the corresponding tail bit is not set. In that case, PA(N) and IS_Addr_table(N) are reset to 0 to avoid unwanted matches in the future. Following example illustrates the tail bit mechanism (one instruction replaced by two patch instructions):

Consider the example in Table 1 (N=2). After initialization IS_Addr_table[2:0]=[0, 2, 0].
1. When the ARM address matches (HADDR) PA0, the instruction at index IS_Addr_table(0) (=0, so PI0) will be fetched and put on the AHB bus 4. Since the tail bit is '1' for this instruction, PA(N)=PA(2)=PA0+2/4 and IS_Addr_table(2)=IS_Adrr_table(0)+1=1.
2. The next access of the ARM core 2 to PA0+2/4 causes a match with PA(2). Due to this, the instruction at index IS_Addr_table(2) (=1, so PI1) will be fetched and put on the AHB bus 4. Since the tail bit is '0' for this instruction, PA(2) and IS_Addr_table(2) are reset to 0.

Patching with a Thumb BL Patch Instruction

The 32-bit thumb BL instruction of the ARM processor 2 comprises a 16-bit BL_H and a 16-bit BL_L part, so the full instruction has to be read in two cycles. Out of these two parts, BL_L is stored in the 16 MSB of the patch instruction and BL_H in the 16 LSB. The BL mechanism starts like in a normal case with a match, a fetch and putting the duplicated 16 LSB (BL_H) on the AHB bus 4. Additionally the controller 18 will assign PA(j)+2 to PA(N) and IS_Addr_table(j) to IS_Addr_table(N) (meaning the same instruction will be fetched on match with PA(N)). If the ARM core 2 fetches the next instruction (PA(j)+2 !), a match will occur with PA(N). The same instruction as the previous one is returned from the registers 10, but this time the 16 MSB are sent to the multiplexer (BL_L). PA(N) and IS_Addr_table(N) are reset to 0 to avoid unwanted matches with PA0)+2 in the future. Following example illustrates the mechanism:

Consider a situation like the example in Table 2, with PI1 a thumb BL instruction. After initialization IS_Addr_table[2: 0]=[0, 1, 0].
1. When the ARM address matches PA1, the instruction at index IS_Addr_table(1) (=1, so PI1) will be fetched and the 16 LSB are put on the AHB bus 4 (duplicated). Since the BL bit is '1' for this instruction, PA(N)= PA(2)=PA1+2 and IS_Addr_table(2)=IS_Adrr_ table(1)=1.
2. The next access of the ARM core 2 to PA1+2 causes a match with PA(2). Due to this, the instruction at index IS_Addr_table(2) (=1, so PI1) will be fetched and this time the 16 MSB are duplicated and put on the AHB bus 4. Finally, PA(2) and IS_Addr_table(2) are reset to 0.

Combining Tail Bit and BL Mechanism

Note that in thumb mode a BL instruction is only allowed inside patch blocks if it is the last one (with tail not set).

Data Replacement

As mentioned earlier, 32-bit data stored in the ROM 6 can be patched directly. It is enough to program the location in a patch address register 10 and put the right 32-bit data in the corresponding instruction register (so, you are patching data and not really an instruction). Thus, on every hit with this address the patched 32-bit data will be returned. This is valid for both ARM and THUMB mode. In this last case, the PRC control module 14 checks the size of the bus access through AHB signal HSIZE. If it is 32-bit, the complete PI is put on the bus 4 instead of the duplicated 16 LSB.

Problem Cases

The following paragraphs explain two cases for which the ARM's pipelining can cause a patch to fail. It is the responsibility of the patch designer to avoid such situations.

Problem Case 1

Figure 4:
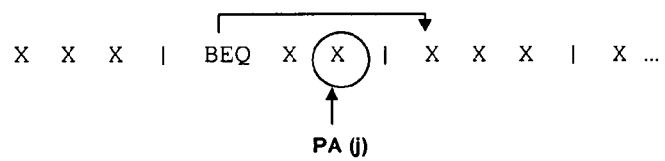
FIGS. 4 and 5 show situations in which problems can occur.

FIG. 4 shows a first problem case which affects both BL and the Tail mechanism. FIG. 4 shows a piece of code (X=instruction, not a branch) and the vertical lines show the ARM pipeline (pre-fetch).

The ARM pre-fetches PA(j)−4/8, PA(j)−2/4 and PA0). On PA0) a match will occur. If tail(j) is '1' or the patch is a BL instruction (thumb only), access on PA(j)+2/4 will return the patch instruction, but this is not wanted, since due to the BEQ the instruction on PA(j) will never have to be executed and so the patch should never be started.

The hardware cannot detect a pipeline flush, so in these cases it is probably best to put PA(j) somewhere safer (e.g. on BEQ).

Problem Case 2

Figure 5:
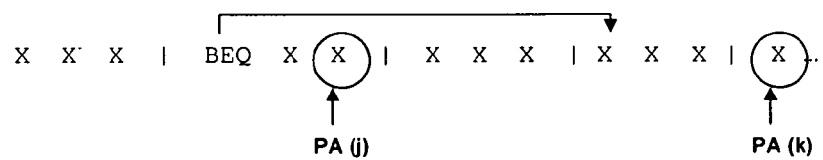

FIG. 5 shows a second problem case which can arise for the BL mechanism (thumb).

If, due to the prefetch, the first part of a BL has already been put on the bus, the next hit will multiplex the 16 MSB to the bus 4. Due to a pipeline flush, the BL mechanism never ended. If at the next hit (PA(k)) the patch instruction is also a BL, the wrong data (i.e. 16 MSB) will be put on the bus 4. The present invention foresees to immediately stop the BL mechanism, when the patch instruction for PA(k) is NOT a BL. In this last case the correct data (16 LSB) are put on the bus 4.

Registers Description

FIG. 6 shows details of the registers that are used, i.e. the registers in the register bank 10.

Status Register

This 1-bit register indicates that patching can start. It should be set high when all other registers are written.

IS_Base Register

This register specifies where in internal RAM 8 the block of 2×N 32-bit patch instructions is stored. This RAM block is write protected from the moment the Status bit is set.

PA_LSB(I) Registers

Those registers contain the 16 LSB of start addresses in ROM 6 where code has to be patched.

PA_MSB(I) Registers

Those registers contain the 3 MSB of start addresses in ROM 6 where code has to be patched.

Note: the ROM can have a 19-bit address bus but this can be easily upgraded to 32-bit.

Tail(J) Registers

Each bit indicates whether the instruction at the next address of the instruction set belongs to a patch block (tail bit='1') or not (tail bit='0'). Since the tail bit of the last instruction is always '0', there are 2×N−1 tail bits for 2×N instructions.

BL(J) Registers

2×N bits, organized as 16-bit R/W registers, that indicate if the patch instruction is a thumb mode BL instruction.

The patching control module 10 of the present invention may be implemented as an integrated circuit. The non-volatile memory in which the instructions are stored, e.g. the read only memory (ROM) 6 can form part of the same integrated circuit as the patching control module, or the same package. The processor core 2 and optionally the second memory, e.g. RAM 8 can also form part of the same integrated circuit as the patching control module, or the same package. Alternatively, the second memory 8 can be an external memory. Such arrangements can be a 'System-on-Chip'.

The present invention includes a patching device, a processor arrangement or a method of patching code substantially as described herein with reference to and as shown in the accompanying drawings. However, the invention is not limited to the embodiments described herein, which may be modified or varied without departing from the scope of the invention as defined in the attached claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A patching device for use with a processor having a first non-volatile memory which stores data and a second memory for storing a plurality of patch data items, wherein each patch data item in the second memory is associated with an indicator indicating whether the patch data item precedes one of the other patch data items in a block of patch data items, the patching device comprising:

a third memory having a plurality of memory locations, one memory location being a patch block memory location, each memory location configured to store an address, in the first memory, at which a patch is to be performed, wherein each address stored in the plurality of memory locations in the third memory is associated with one of the plurality of data items in the second memory;

a comparator which is configured to compare a first address of the first memory that is being accessed by the processor with the addresses stored in the third memory; and a control unit which is configured to select between data from the first memory or one of the plurality of patch data items from the second memory depending on the comparison, and when the first address of the first memory that is being accessed by the processor matches an address stored in the third memory to:

select the one of the plurality of patch data items that corresponds to the first address of the first memory that is being accessed;

determine whether the indicator associated with the selected one of the plurality of patch data items indicates that the selected one of the plurality of patch data items precedes one of the other patch data items in a block of patch data items, such that a data item at the first address in the first memory is to be patched with a plurality of patch data items in the block of patch data items; and when the control unit determines that the selected one of the plurality of patch data items precedes one of the other patch data items in a block of patch data items:

store in the patch block memory location a next address in the first memory that is subsequent to the first address of the first memory that is being accessed by the processor; and associate the next address in the first memory with the one of the other patch data items that the selected one of the plurality of patch data items precedes in the block of patch data items.

2. A patching device according to claim 1, wherein the third memory comprises a plurality of patch address registers, each memory location being a register.

3. A patching device according to claim 1, wherein the address of the first memory that is being accessed by the processor is on a bus external to the processor.

4. A patching device according to claim 1, wherein the comparator is configured to perform the comparison of the address of the first memory that is being accessed by the processor with each of the addresses stored in the plurality of memory locations in the third memory, in parallel.

5. A patching device according to claim 1 which further comprises a store of an address, in the second memory, at which the patch data is stored.

6. A patching device according to claim 5, wherein the store is configured to store a base address of an area of the second memory where the patch data is stored and an index which points to a respective patch within that area.

7. A patching device according to claim 1 further comprising at least one memory location for storing an indication of whether a patch instruction code is a THUMB mode Branch and Link instruction.

8. A patching device according to claim 1 in the form of an integrated circuit.

9. A method of patching code in a processor which has a first non-volatile memory which stores data and a second memory for storing a plurality of patch data items, wherein each patch data item in the second memory is associated with an indicator indicating whether the patch data item precedes one of the other patch data items in a block of patch data items, the method comprising:
   storing, in a plurality of memory locations in a third memory, addresses, in the first memory, at which a patch is to be performed, one memory location being a patch block memory location, wherein each address stored in the plurality of memory locations in the third memory is associated with one of the plurality of data items in the second memory;
   comparing a first address of the first memory that is being accessed by the processor with the addresses stored in the third memory;
   selecting between data from the first memory or one of the plurality of patch data items from the second memory depending on the comparison, and when the first address of the first memory that is being accessed by the processor matches an address stored in the third memory:
   selecting the one of the plurality of patch data items that corresponds to the first address of the first memory that is being accessed;
   determining whether the indicator associated with the selected one of the plurality of patch data items indicates that the selected one of the plurality of patch data items precedes one of the other patch data items in a block of patch data items, such that a data item at the first address in the first memory is to be patched with a plurality of patch data items in the block of patch data items; and
   when it is determined that the selected one of the plurality of patch data items precedes one of the other patch data items in a block of patch data items:
   storing in the patch block memory location a next address in the first memory that is subsequent to the first address of the first memory that is being accessed by the processor; and
   associating the next address in the first memory with the one of the other patch data items that the selected one of the plurality of patch data items precedes in the block of patch data items.

10. A method according to claim 9, wherein the comparing of the address of the first memory that is being accessed by the processor is done on a bus external to the processor.

11. A method according to claim 9, wherein the comparing of the address of the first memory that is being accessed by the processor with each of the addresses stored in the plurality of memory locations in the third memory, is done in parallel.

12. A method according to claim 9 further comprising storing of an address, in the second memory, at which the patch data is stored.

13. A method according to claim 12, wherein the storing is of a base address of an area of the second memory where the patch data is stored and of an index which points to a respective patch within that area.

14. A method according to claim 9 further comprising storing an indication of whether a patch instruction code is a THUMB mode Branch and Link instruction.

* * * * *